US010464482B2

(12) United States Patent
Shuster et al.

(10) Patent No.: US 10,464,482 B2
(45) Date of Patent: Nov. 5, 2019

(54) IMMERSIVE DISPLAYS

(71) Applicants: UTHERVERSE DIGITAL INC., Vancouver (CA); Gregory A. Piccionelli, Vancouver (CA)

(72) Inventors: Brian Shuster, Vancouver (CA); Gregory A. Piccionelli, Westlake Village, CA (US)

(73) Assignee: Utherverse Digital Inc., Vancouver (CA)

( * ) Notice: Subject to any disclaimer, the term of this patent is extended or adjusted under 35 U.S.C. 154(b) by 0 days.

(21) Appl. No.: 15/206,100

(22) Filed: Jul. 8, 2016

(65) Prior Publication Data
US 2017/0024933 A1    Jan. 26, 2017

Related U.S. Application Data

(60) Provisional application No. 62/195,201, filed on Jul. 21, 2015.

(51) Int. Cl.
*B60R 1/00* (2006.01)
*G06F 3/01* (2006.01)
*B60K 35/00* (2006.01)

(52) U.S. Cl.
CPC ............ *B60R 1/00* (2013.01); *B60K 35/00* (2013.01); *G06F 3/011* (2013.01); *G06F 3/013* (2013.01); *B60K 2370/152* (2019.05); *B60K 2370/173* (2019.05); *B60K 2370/176* (2019.05); *B60K 2370/182* (2019.05); *B60R 2300/806* (2013.01)

(58) Field of Classification Search
CPC ..... B60R 1/00; B60R 2300/806; G06F 3/013; B60K 35/00; B60K 2350/106; B60K 2350/1088
USPC ........................ 345/619, 632, 633
See application file for complete search history.

(56) References Cited

U.S. PATENT DOCUMENTS

| 6,456,262 | B1* | 9/2002 | Bell ............... | A61B 3/113 345/472 |
| 2007/0019311 | A1* | 1/2007 | Stricek .............. | G03B 37/04 359/864 |
| 2009/0219387 | A1* | 9/2009 | Marman .......... | G08B 13/19652 348/143 |
| 2010/0201508 | A1* | 8/2010 | Green ............... | B60Q 9/008 340/435 |
| 2012/0249791 | A1* | 10/2012 | Shen ................ | H04N 7/181 348/148 |
| 2014/0176700 | A1* | 6/2014 | Wang ............... | H04N 5/23238 348/118 |

(Continued)

*Primary Examiner* — Sarah Lhymn
(74) *Attorney, Agent, or Firm* — Borden Ladner Gervais LLP; Geoffrey deKleine

(57) ABSTRACT

A method of operating an immersive display includes obtaining first images of environment in a first region in front of the immersive display, obtaining second images of environment in a second region outside the first region, which second region is not in front of the immersive display, displaying the first images of the environment on a first area of at least one display of the immersive display to provide a field of view of the environment in front of the immersive display, and displaying the second images of the environment in the second region on a second area of the at least one display to provide images outside the field of view of the environment in front of the immersive display. The first area is delineated from the second area.

21 Claims, 3 Drawing Sheets

(56) References Cited

U.S. PATENT DOCUMENTS

| | | | |
|---|---|---|---|
| 2014/0361977 A1* | 12/2014 | Stafford | G02B 27/0093 345/156 |
| 2015/0317956 A1* | 11/2015 | Lection | G02B 27/017 345/633 |
| 2016/0077337 A1* | 3/2016 | Raffle | G06F 3/013 345/156 |
| 2016/0313790 A1* | 10/2016 | Clement | G06F 3/011 |

* cited by examiner

IMMERSIVE DISPLAYS

FIELD OF TECHNOLOGY

The present disclosure relates to immersive displays such as three-dimensional (3D) displays for displaying virtual or augmented reality environments.

BACKGROUND

Immersive displays are becoming increasingly popular for the purpose of playing games in a virtual reality environment. These immersive displays may also be utilized for applications other than gaming, including, for example, augmented reality applications. The virtual world or augmented-reality is currently commonly perceived by the user based on two images, with each of the two images displayed close to a respective one of the user's eyes.

Such displays are often head-mounted and in many cases block out some or all of the real environment around the user in order to immerse the user, for example, in the virtual world. Thus, these displays may obstruct or block the user's vision of his or her surroundings. The virtual world or augmented-reality is perceived by the user based on images displayed very close to the user's eyes.

Improvements in immersive displays and applications or uses of such immersive displays are desirable.

SUMMARY

According to one aspect, a method of controlling an immersive display is provided. The method includes obtaining first images of environment in a first region in front of the immersive display, obtaining second images of environment in a second region outside the first region, which second region is not in front of the immersive display, displaying the first images of the environment on a first area of at least one display of the immersive display to provide a field of view of the environment in front of the immersive display, and displaying the second images of the environment in the second region on a second area of the at least one display to provide images outside the field of view of the environment in front of the immersive display. The first area is delineated from the second area.

According to another aspect, an immersive display is provided. The immersive display includes a body, at least one display on the inside of the body for displaying images in front of a user's eyes, and a processor coupled to the display. The processor is operable to obtain first images of environment in a first region in front of the immersive display, obtain second images of environment in a second region outside the first region, which second region is not in front of the immersive display, display the first images of the environment on a first area of at least one display of the immersive display to provide a field of view of the environment in front of the immersive display, and display the second images of the environment in the second region on a second area of the at least one display to provide images outside the field of view of the environment in front of the immersive display. The first area is delineated from the second area.

BRIEF DESCRIPTION OF THE DRAWINGS

Embodiments of the present disclosure will now be described, by way of example only, with reference to the attached Figures, in which.

DETAILED DESCRIPTION

Figure 1:
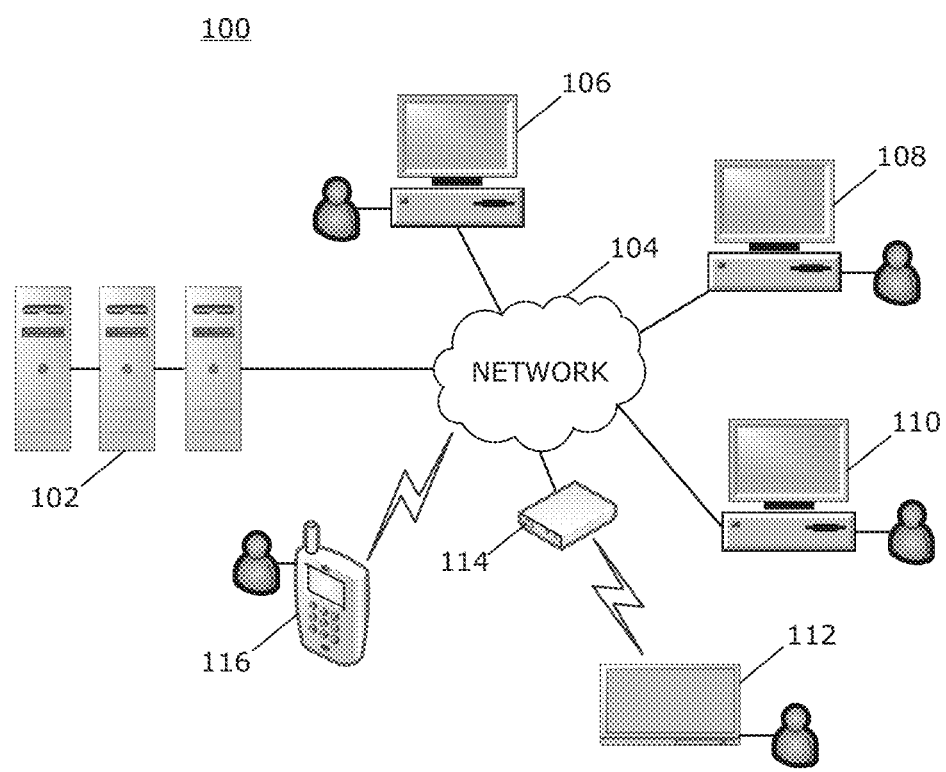
FIG. 1 is a system for providing a multi-user virtual event.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The following describes an immersive display and a method of controlling the immersive display. The method includes obtaining first images of environment in a first region in front of the immersive display, obtaining second images of the environment in a second region outside the first region, which second region is not in front of the immersive display, displaying the first images of the environment on a first area of at least one display of the immersive display to provide a field of view of the environment in front of the immersive display, and displaying the second images of the environment in the second region on a second area of the at least one display to provide images outside the field of view of the environment in front of the immersive display. The first area is delineated from the second area.

A system 100 for providing a multi-user virtual event is illustrated in FIG. 1. The system includes servers 102 that are coupled to a network 104 or networks, which includes the internet and may optionally include a cellular network through which several client devices, nodes, or terminals may be connected. In the example of FIG. 1, five client devices are coupled to the network 104, including desktop computers 106, 108, 110, a laptop computer 112 which is coupled to the network wirelessly through a modem 114, and a smartphone 116. The servers 102 store and execute software or firmware and communicate and cooperate with software and firmware on the client devices 106, 108, 110, 112, 116 via the network. The software and firmware on the client devices 106, 108, 110, 112, 116 also communicate and cooperate with software and firmware on respective immersive displays that may be worn by the users.

The servers 102, utilizing the software or firmware, provide the virtual environment, which may be a three-dimensional virtual environment. The environment may be any suitable environment for a game, a social network or interaction site, a meeting environment, such as a boardroom or meeting room, a classroom, a conference room or any other room or other scene. The virtual environment provided is dependent on the application and may be dependent on any other suitable factor such as the number of participants.

The servers 102 also manage authorization of users via client devices to facilitate participation in the virtual environment by avatars representing the users. The avatars enter the virtual environment to take part in or attend an event such as a game, a social network event or interaction, a meeting, class, conference or other event.

The images, including virtual images and a virtual environment, may be provided to the client devices 106, 108, 110, 112, 116 for display utilizing the immersive displays, which may be, for example, head-mounted displays worn by the users.

Figure 2:
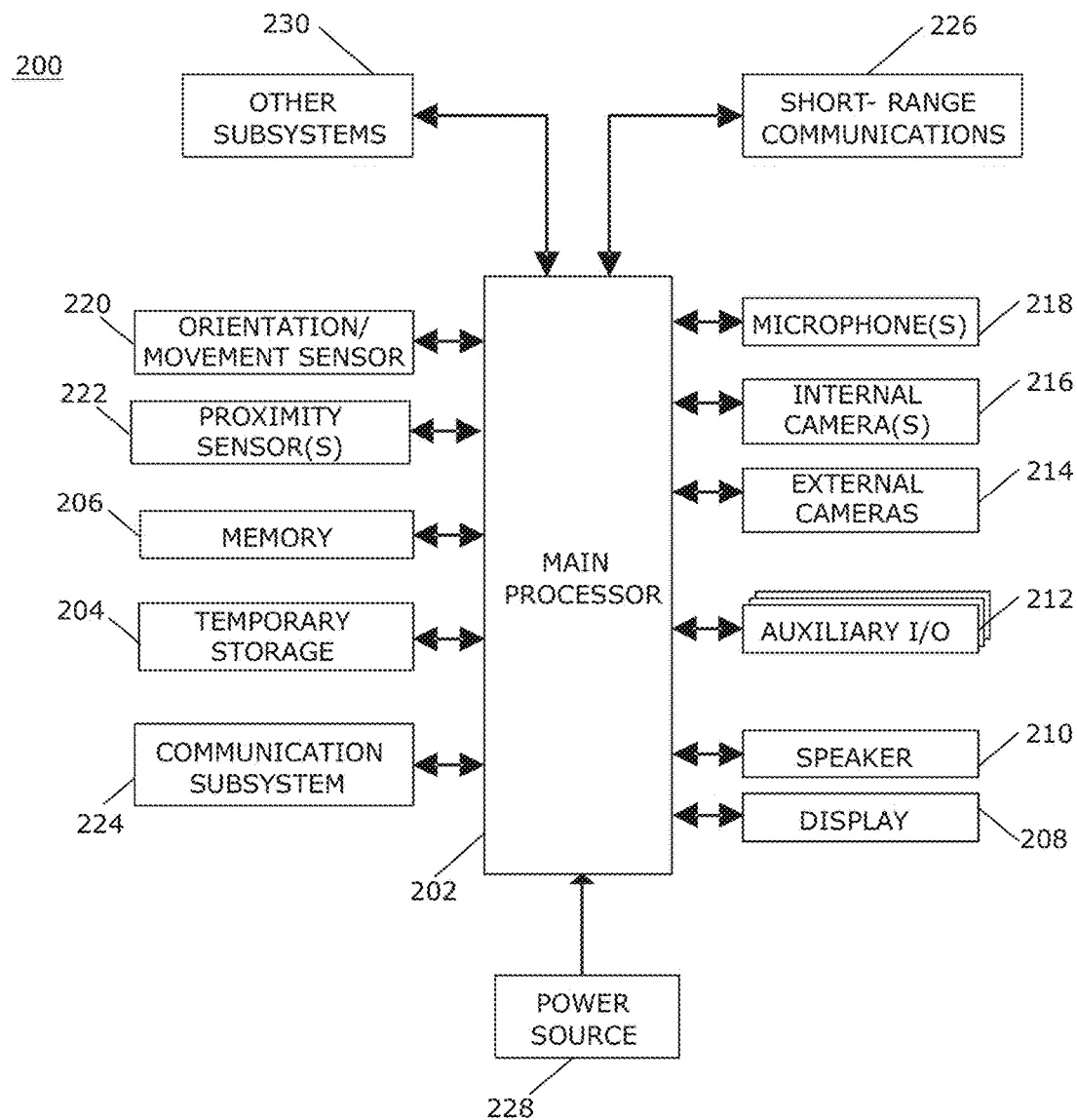
FIG. 2 is a simplified block diagram of an example of an immersive display of the system of FIG. 1.

A simplified block diagram of an example of an immersive display 200 is shown in FIG. 2. The immersive display 200 includes multiple components, such as a main processor 202 that controls the overall operation of the immersive display 200. The immersive display is head mounted.

Optionally, the immersive display may be incorporated into a helmet, such as a bicycle helmet, skateboard helmet, motorcycle helmet, ski or snowboard helmet, or any other suitable helmet. Optionally, the helmet earphones or headphones integrated into the helmet in addition to or in place of a speaker.

The main processor 202 interacts with other components of the immersive display 200, including, for example, a temporary storage device 204, a memory 206, a display device 208, a speaker 210, an auxiliary input/output (I/O) subsystem 212, external cameras 214, one or more internal cameras 216, one or more microphones 218, an orientation/movement sensor 220, one or more proximity sensors 222, a communication subsystem 224, short-range communications 226, a power source 228, and, optionally, other subsystems 230.

The temporary storage device 204 may be, for example, Random Access Memory (RAM) that stores data that is processed by the main processor 202. The memory 204, such as flash memory, is utilized for persistent storage.

The immersive display 200 provides video output through the display 208, which includes an interface, a controller and at least one display. For example, the immersive display may include a pair of displays to display images. The images displayed in this example include a respective image in front of each one of the user's eyes such that a right side image is displayed in front of a user's right eye and a left side image is displayed in front of a user's left eye. In addition to the display 208, output is provided via the speaker 210 or other audio output such as headphones or earphones. The auxiliary input/output (I/O) subsystem 212 includes an interface through which, for example, a USB controller or other peripheral device may be connected.

Input to the immersive display may be provided via external sensors or input devices such as the external cameras 214 mounted on the body of the immersive display 200. The external cameras 214 may include multiple cameras to obtain images extending around the user, i.e., 360° around the user. The external cameras 214 may also include cameras to obtain images in an upward direction from the user, and in a downward direction from the user. Each of the cameras includes the functional components for operation of the camera, including the lens, the image sensor, and, optionally, a light sensor and light source, such as infrared light emitting diodes (LEDs). Thus, the cameras provide images of the user's environment or surroundings. The cameras may be one or more of visual light cameras, 3D sensing cameras, light field cameras, forward looking infrared cameras, near infrared cameras, ultraviolet cameras, or other imaging devices.

The terms upward and downward are utilized herein to generally describe direction of view of the external cameras 214 relative to the user when the immersive display is worn by the user and the user is in an upright position, and such terms are not otherwise limiting.

The one or more internal cameras 216, referred to herein as the internal camera 216, may be mounted on an inside of the body of the immersive display and includes the functional components for operation of each internal camera, including the lens, the image sensor, and a light source, which may be a light source in the non-visible spectrum, such as infrared LEDs. Although the interior of the immersive display 200 may be dark because exterior light is blocked out or partially blocked out, the light source provides sufficient light for use of the internal camera 216.

The one or more microphones, referred to herein as the microphone 218, may also be mounted in the body of the immersive display 200 to provide input by converting audible information to electrical signals, which may be processed by the main processor 202 and may be transmitted to another electronic device to which the immersive display 200 is coupled. For example, the immersive display may be coupled to a smart-phone, a laptop computer, a tablet, a desktop computer, a game device, and any other suitable electronic device.

The main processor 202 also receives signals from the orientation/movement sensor 220, which is coupled to the body of the immersive display 200. The orientation/movement sensor may be, for example, an accelerometer, a gyro sensor, or any other suitable sensor or combination of sensors that is or are utilized to detect direction of movement, direction of gravitational forces, and reaction forces so as to determine, for example, the orientation of the immersive display 200 and the movement of the immersive display 200.

The one or more proximity sensors, referred to herein as the proximity sensors 222, may provide additional input to the main processor 202 to detect the presence of objects that are near or proximal to the sensor and thus to the user when the immersive display 200 is in use. The proximity sensors 222 may be any suitable proximity sensors such as a capacitive or photoelectric proximity sensor.

The communication subsystem 224 receives signals from another electronic device such as the client devices 106, 108, 110, 112, 116 shown in FIG. 1, and sends signals to the other electronic device to which the immersive display is coupled. Thus, for example, the signals from the microphone 218 or signals from the external cameras 216 or from the internal camera 216 may be sent via the communication subsystem 224. The communication subsystem 224 is also responsible for receiving signals from the other electronic device for processing by the main processor 202 to cause images, which may include video, to be displayed on the display 208 and for audio to be output through the speaker 210.

The immersive display 200 optionally includes short-range communications 226 to perform various communication functions. For example, the immersive display 200 may include Bluetooth or infrared (IR) communications capability, for example, for communicating with a peripheral device or accessory.

The power source 228 may be one or more rechargeable batteries or a port to an external power supply to power the immersive display 200.

The systems and subsystems that interact with the main processor 202 and are described herein are provided as examples only. Other subsystems 230 may also interact with the main processor 202.

Utilizing the images from the internal camera 216, the main processor 202 may be operable to track eye motion. To track eye motion, the user's pupils may be tracked when the immersive display 200 is in use. The eye motion tracking may also facilitate determination of what a user is looking at, for example, by triangulation to determine depth of an object or image that a user is looking at. Alternatively, the internal camera 216 may identify or track changes in muscles or muscle motion around at least one of the user's eyes to identify movement of the eye, or may track changes in shape of a lens of an eye or changes in shape of the lens of each eye to identify a focal distance, facilitating identification of the depth of focus of a user.

In one aspect, variable focal optical elements, such as the SUPERFOCUS™ glasses may be utilized and controlled digitally to create a more realistic blur effect. Areas that are set to be blurred may be rendered with fewer pixels.

Based on the eye motion tracking, the direction that the user is looking may be identified. The direction may be, for example, an angle or angles, such as angular offset or offsets from straight ahead. Thus, when a user glances upwardly, downwardly, or to either side, the direction is identified and the images displayed utilizing the display 208 may be changed or adjusted based on the direction.

The main processor 202 is also operable to analyze the images from the internal camera to track or identify a change in facial expression. For example, the main processor 202 may utilize primary facial feature tracking by tracking features such as lips, nose, and eyes. Alternatively, or in addition, movement of parts of the face may be tracked. The main processor 202 may transmit facial expression data or an identification of the expression to the other electronic device to which the immersive display 200 is coupled via the communication subsystem 222.

The main processor 202 is also operable to receive the image data from the external cameras and to transmit the data to the other electronic device, along with metadata for at least key frames for identifying the image data such that the images can be stitched together to provide images of the user's surroundings. Thus, the images from each of the cameras can be stitched together to obtain images of the user's entire surroundings.

Figure 3:
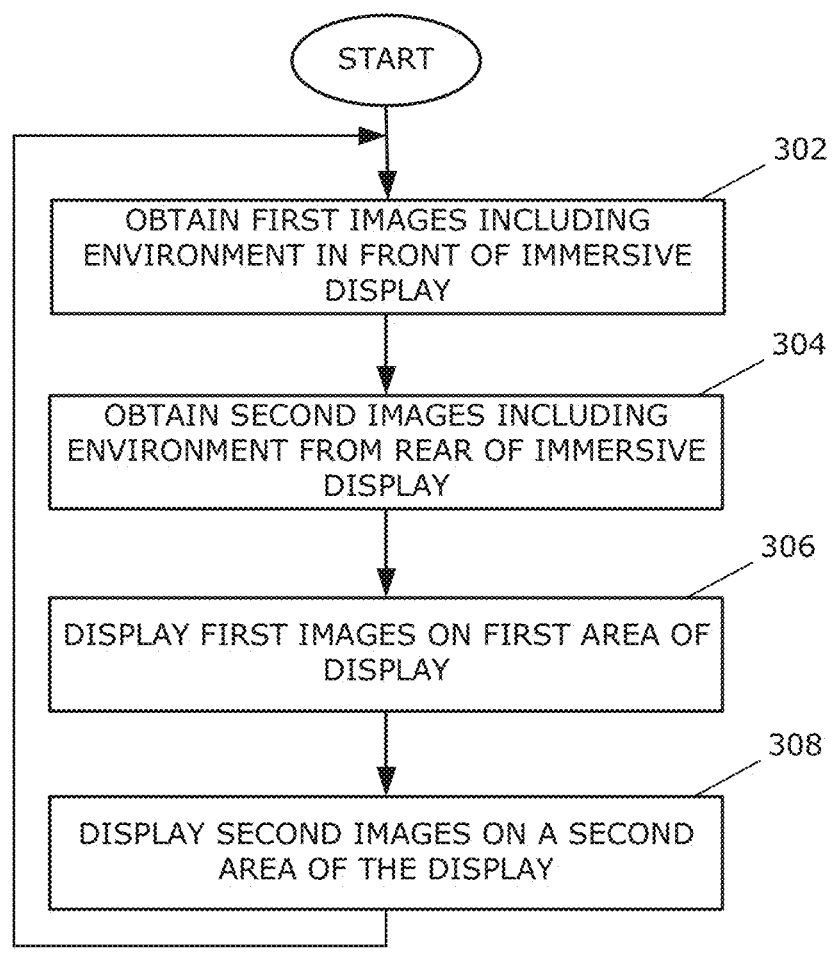
FIG. 3 is a flowchart illustrating an example of a method of controlling the display of information on an immersive display.

A flowchart illustrating a method of controlling an immersive display is shown in FIG. 3. The method may be carried out by software executed, for example, by the main processor 202 of the immersive display 200, by one or more of the client devices 106, 108, 110, 112, 116, or by any combination of the immersive display 200, a client device and one or more of the servers 102. Coding of software for carrying out such a method is within the scope of a person of ordinary skill in the art given the present description. The method may contain additional or fewer processes than shown and/or described, and may be performed in a different order. Computer-readable code executable by at least one processor to perform the method may be stored in a computer-readable medium, such as a non-transitory computer-readable medium.

Images are obtained at 302, for example, by processing images from the external cameras 214 of the immersive display 200. The images are images of the environment that is generally in front of the immersive display 200. The environment that is generally in front of the immersive display 200 includes images of a peripheral area. The images may include images of the environment extending about 180°. The images may be generally centered on the immersive display 200 or may be centered on a direction that the user is looking or direction of gaze, as determined utilizing the internal camera 216, for example by eye motion tracking or facial feature tracking.

The images obtained may include images for displaying a right side image in front of a right eye and a left side image in front of a left eye of a user of the immersive display 200 to provide a virtual 3-D image for the user.

Images of the environment that is not in front of the immersive display, for example, behind the immersive display 200 or to the left or right side of the immersive display 200, are also obtained at 304. The images may include images of the environment extending about 180° around a back side or rear of the immersive display 200. Thus, with the images of the environment extending about 180° around a front of the immersive display, images extending 360° around the immersive display 200 are obtained. The images may be obtained by processing images from external cameras 214 that are directed to the rear or to sides of the immersive display 200. Alternatively, the images may be communicated from another electronic device. According to one example, images may be obtained utilizing cameras, such as a rearview camera, in a vehicle. The vehicle may be in communication with a respective client device 106, 108, 110, 112, 114, or may communicate directly with the immersive display 200, for example, by BLUETOOTH™ communication to send images to the client device or immersive display 200.

The images obtained at 302 and the images obtained at 304 need not be obtained in separate steps. These images may be obtained together, for example by obtaining panoramic views or may be obtained utilizing a 360° camera.

At 306, the images of the environment that is generally in front of the immersive display 200, are displayed on a first area of the display 208. Thus, for a display 208 that includes two display screens, each disposed in front of and very close to a respective eye of a user, the environment is displayed in a first area on each of the display screens. The images are displayed on the display 208 to provide the user with a generally full field of view of the environment generally in front of the immersive display 200. The view may be a full field of view based on the orientation of the immersive display 200 or based on the direction in which the user is looking.

At 308, the images of the environment that is not in front of the immersive display, for example, behind the immersive display 200 or to the left or right side of the immersive display 200, are also displayed on the display 208. The images are displayed to provide a view of the environment that is generally outside the full field of view of the environment in front of the immersive display 200. For example, the images may be images that are behind the user. The images are displayed in a second area of the display 208 to provide a view of areas that, in the absence of the immersive display 200, would be out of the field of view of the user. The two areas of the display 208 therefore may display images of the environment extending a complete 360° around the immersive display 200 and therefore around the user.

The images are displayed in a second area of the display 208 that is delineated from the first area. For example, the images may be displayed on an image of a rearview mirror, to delineate the images of the environment that is generally in front of the immersive display 200 from the images of the environment that is generally to the rear of the immersive display 200. The images may also or alternatively be displayed, for example, on an image of a sideview mirror or mirrors. Alternatively, the images may be delineated utilizing delineation lines or borders between the images, or utilizing any other suitable technique to facilitate identification of the images as images of the environment that is generally to the rear of the immersive display 200.

Optionally, the images displayed in the second area are displayed in response to a user looking in a particular direction. For example, eye tracking or facial tracking may be utilized to determine when a user glances upwardly and, in response to determining that the user glances upwardly, the images may be displayed to provide a view of the environment generally to the rear of the immersive display. The images may also or alternatively be displayed in response to the user glancing to the left or right. Thus, the images are not displayed until the user glances toward the delineated area or areas.

In the example of use of the immersive display in communication with a processor of a vehicle, the images may also be displayed in response to detecting or determining that the vehicle is put in reverse gear, when an object, such as another vehicle is detected in a blind spot, or is detected on one side of a vehicle.

The external cameras may also be utilized to detect movement, for example, in an area outside the field of view and the images may be displayed in the delineated area based on the detected movement, for example, or based on proximity of detected movement.

Optionally, the different areas may be displayed utilizing different attributes. For example, the first area, in which the displayed images are processed images of the environment generally in front of the immersive display 200, is displayed utilizing first display attributes. The second area, in which processed images from the rear of the immersive display are displayed, is displayed utilizing second display attributes. For example, the two areas may be displayed at different resolutions and different refresh rates. Thus, the images in the second area may be displayed at lower resolution and a lower refresh rate.

The method illustrated in FIG. 3 is continuous such that the images are continuously updated on the display 208 of the immersive display 200 to display the environment generally in real time or close to real time.

Optionally, data from multiple virtual or real world sources may be aggregated on the display 208, against a single background. For example, the depth of field for objects from a first source is narrowed and placed behind a similarly narrowed depth of field for objects from a second source. Data from more than two sources may be aggregated. In one example, a field may be used as a background object. In the example of a virtual reality game or a virtual environment, images from the game or the virtual environment may be displayed within a perceived depth of field of, for example, from 10 centimeters to 3 meters. Images from the real world or augmented reality may be displayed at a perceived depth of field of, for example, from 4 meters to infinity. Thus, in this example, the images of the environment that are obtained, for example, from the external cameras 214, are displayed in two areas of the display, which areas are delineated from each other, at a perceived depth of field of from 4 meters to infinity.

In one implementation, virtual reality or augmented reality is integrated with images of the actual or real environment by, for example, making part of or the entire perceived closest image semi-transparent.

In another implementation, a game or virtual environment may be displayed at 50% opacity with an altered and/or slightly or fully flattened depth of field, for example, perceived as from 30 centimeters inches to 3 meters. The actual or real environment may be displayed with an altered and/or slightly or fully flattened depth of field, perceived as from 3.1 meters to infinity. Optionally, user eye movements may be tracked and utilized to alter the opacity of a portion of the image or images from one source, to invert the foreground and background images, to change the perceived depth or amount of flattening, to make images from one source have negligible depth of field allowing a fuller depth of field in the images from the other source without overlapping, or any suitable combination thereof.

According to one example of the method of controlling the immersive display 200, images from a virtual environment are displayed on the display 208 of the immersive display 200 at a perceived depth of greater than 3 meters, for example.

In addition, images are obtained at 302, for example, by processing images from the external cameras 214 of the immersive display 200. The images are images of the environment in front of and generally centered on the immersive display. The images include a peripheral area to provide a generally full field of view for the user. Images from behind the immersive display 200 are also obtained at 304 utilizing external cameras 214.

At 306, the images of the environment that is generally in front of the immersive display 200, are displayed on a first area of the display 208, at a depth of up to 3 meters and with an opacity of 50% to provide the user with a generally full field of view of the environment generally in front of the immersive display 200 while facilitating viewing the virtual environment. At 308, the images that are from the rear of the immersive display 200 are displayed above the images from the front of the immersive display 200 and separated by a black line to delineate the images.

According to another example of the method of controlling the immersive display 200, only real world images are displayed for the purpose of driving, for example a car. Images are obtained at 302, for example, by processing images from the external cameras 214 of the immersive display 200. The images are images of the environment in front of and generally centered on the immersive display. The images include a peripheral area to provide a generally full field of view for the user. Images from behind the car are processed from images received from a rear view camera of the car in communication with the immersive display 200, for example, via a client device to which the immersive display 200 is coupled.

At 306, the images of the environment that is generally in front of the immersive display 200 are displayed on a first area of the display 208 to provide a view through the windshield of the car and through a driver side window and a passenger side window of the car. At 308, the images that are processed from the rear view camera are displayed on an image of a rear view mirror.

According to yet another example of the method of controlling the immersive display 200, the immersive display 200 is integrated into a helmet to provide protection for the user and is worn, for example, while the user is cycling. Images are obtained at 302, for example, by processing images from the external cameras 214 of the immersive display 200. The images are images of the environment in front of and generally centered on the immersive display. The images include a peripheral area to provide a generally full field of view for the user. Images from behind the immersive display 200 are also obtained at 304 utilizing external cameras 214.

At 306, the images of the environment that is generally in front of the immersive display 200, are displayed on a first area of the display 208. At 308, the images that are from the rear of the immersive display 200 are displayed above a horizon line of the road and are separated, for example, by a line to delineate the images. The views from behind may include a full view of areas not normally visible to the user when looking forward. Thus, the images displayed at 208 provide the user with images of the environment behind and to the sides of the immersive display 200, without requiring the user to turn around or adjust their head position or orientation.

Advantageously, views of areas of the environment that are toward a back or rear of the immersive display 200, such as areas directly behind as well as areas behind and to the sides of the immersive display 200, are displayed in addition to a field of view toward the front of the immersive display 200. Thus, areas that are not visible to the user without the use of the virtual display 200, are displayed and are discernible from the images taken from the front of the immersive display 200. The images from areas other than in front of the immersive display 200 can be viewed by moving one's eyes and without requiring the user to turn around or adjust their head position or orientation.

The described embodiments are to be considered as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

What is claimed is:

1. A method of controlling an immersive display, the method comprising:
   obtaining, at a processor of the immersive display, first images of environment in a first region in front of the immersive display;
   obtaining, at the processor of the immersive display from a camera external to a body of the immersive display, second images of the environment in a second region outside the first region, which second region is not in front of the immersive display;
   displaying the first images of the environment on a first area of at least one display of the immersive display to provide a field of view of the environment in front of the immersive display;
   detecting, by the processor of the immersive display, movement in the second region, outside the field of view of the environment in front of the immersive display; and
   displaying the second images of the environment in the second region on a second area of the at least one display to provide images outside the field of view of the environment in front of the immersive display,
   wherein the second images are displayed above a horizon line of the first images and are delineated from the first images,
   the first images providing a first view of the environment generally in front of the immersive display and the second images including a second view behind and to the sides of the immersive display, such that the first images and the second images provide separate views that together extend 360° around the immersive display.

2. The method according to claim 1, wherein the first images and the second images are received from external cameras of the immersive display.

3. The method according to claim 1, wherein obtaining first images comprises determining a direction of gaze and the first images are dependent on the determined direction of gaze.

4. The method according to claim 1, wherein the first images include a right side image for display on a right side and a left side image for display on a left side.

5. The method according to claim 1, wherein displaying the second images comprises displaying the second images on an image of at least one of a rearview mirror and a sideview mirror.

6. The method according to claim 1, comprising determining a direction of a user's glance and wherein displaying the second images comprises displaying in response to determining that the direction of the user's glance is toward the second area.

7. The method according to claim 1, wherein the immersive display is in communication with a second electronic device and the second images are received from the second electronic device.

8. The method according to claim 7, wherein the second electronic device comprises a vehicle and the second images are displayed in response to determining that the vehicle is in reverse gear or in response to determining that an object is located near the vehicle.

9. The method according to claim 1, wherein the first images are displayed with first attributes and the second images are displayed with second attributes, and wherein the first attributes differ from the second attributes.

10. The method according to claim 1, wherein displaying the second images comprises displaying the second images at at least one of a lower resolution and a lower refresh rate than the first images.

11. A non-transitory computer-readable medium having stored thereon, computer-readable code executable by at least one processor of a computing device to perform the method of claim 1.

12. An immersive display comprising:
    a body;
    at least one display on the inside of the body for displaying images in front of a user's eyes;
    a processor coupled to the display and operable to:
      obtain first images of environment in a first region in front of the immersive display;
      obtain, from a camera external to the body, second images of the environment in a second region outside the first region, which second region is not in front of the immersive display;
      display the first images of the environment on a first area of at least one display of the immersive display to provide a field of view of the environment in front of the immersive display;
      detect movement in the second region, outside the field of view of the environment in front of the immersive display; and
      display the second images of the environment in the second region on a second area of the at least one display to provide images outside the field of view of the environment in front of the immersive display,
      wherein the second images are displayed above a horizon line of the first images and are delineated from the first images, the first images providing a first view of the environment generally in front of the immersive display, and the second images providing a second view behind and to the sides of the immersive display, such that the first images and the second images provide separate views that together extend 360° around the immersive display.

13. The immersive display according to claim 12, comprising at least one external camera in communication with the processor for providing the first images and the second images.

14. The immersive display according to claim 12, comprising at least one internal camera in communication with the processor, wherein the processor is configured to determining a direction of gaze based on the input from the internal camera, and wherein the first images are dependent on the determined direction of gaze.

15. The immersive display according to claim 12, wherein the first images include a right side image for display on a right side and a left side image for display on a left side.

16. The immersive display according to claim 12, wherein the second images are displayed on an image of at least one of a rearview mirror and a sideview mirror.

17. The immersive display according to claim 12, comprising at least one internal camera in communication with the processor, wherein the processor is configured to determine a direction of a user's glance based on the input from the internal camera, and wherein the second images are displayed in response to determining that the direction of the user's glance is toward the second area.

18. The immersive display according to claim 12, comprising a communications subsystem or system for communication with a second electronic device, and wherein the second images are received from the second electronic device.

19. The immersive display according to claim 18, wherein the second electronic device comprises a vehicle and the second images are displayed in response to determining that the vehicle is in reverse gear or in response to determining that an object is located near the vehicle.

20. The immersive display according to claim 12, wherein the first images are displayed with first attributes and the second images are displayed with second attributes, and wherein the first attributes differ from the second attributes.

21. The immersive display according to claim 12, wherein the second images are displayed at at least one of a lower resolution and a lower refresh rate than the first images.

* * * * *